(12) United States Patent
Pratten et al.

(10) Patent No.: US 12,547,998 B2
(45) Date of Patent: Feb. 10, 2026

(54) SYSTEM AND METHOD FOR PRESENTING AN ARTIFICIAL INTELLIGENCE-BASED AUTOMATED TELLER MACHINE SESSION

(71) Applicant: The Toronto-Dominion Bank, Toronto (CA)

(72) Inventors: A Warren Pratten, London (CA); Tristan Rodzen, Norway, ME (US)

(73) Assignee: The Toronto-Dominion Bank, Toronto (CA)

( * ) Notice: Subject to any disclaimer, the term of this patent is extended or adjusted under 35 U.S.C. 154(b) by 59 days.

(21) Appl. No.: 18/079,940

(22) Filed: Dec. 13, 2022

(65) Prior Publication Data

US 2024/0193562 A1 Jun. 13, 2024

(51) Int. Cl.
*G06Q 20/10* (2012.01)

(52) U.S. Cl.
CPC ................ *G06Q 20/1085* (2013.01)

(58) Field of Classification Search
CPC .................................. G06Q 20/1085
See application file for complete search history.

(56) References Cited

U.S. PATENT DOCUMENTS

| | | | |
|---|---|---|---|
| 6,523,743 B1 | 2/2003 | Patterson et al. | |
| 7,711,643 B2 | 5/2010 | Nielsen et al. | |
| 10,788,951 B2 | 9/2020 | Allen et al. | |
| 10,901,597 B1 | 1/2021 | Nandanuru et al. | |
| 11,037,115 B2 | 6/2021 | Benkreira et al. | |
| 11,176,786 B2 | 11/2021 | Van Beek Faletti | |
| 11,321,104 B2 | 5/2022 | Sanghvi et al. | |
| 2018/0097910 A1* | 4/2018 | D'Agostino | H04L 67/60 |
| 2018/0239500 A1* | 8/2018 | Allen | G06F 3/0488 |
| 2020/0388116 A1 | 12/2020 | Satanal et al. | |
| 2021/0225131 A1* | 7/2021 | Van Beek Faletti | G07F 19/211 |
| 2021/0303317 A1* | 9/2021 | Sanghvi | G06F 16/9035 |

FOREIGN PATENT DOCUMENTS

| | | |
|---|---|---|
| IN | 201741014470 A | 12/2018 |
| WO | 2021162434 A1 | 8/2021 |

OTHER PUBLICATIONS

Kamfiroozie et al.: "Personalized ATMs: Improve ATMs Usability", published in HCI 2011: HCI International 2011—Posters' Extended Abstracts, pp. 161-166, https://link.springer.com/chapter/10.1007/978-3-642-22098-2_33, 2011.
Gajos et al.: "Automatically generating personalized user interfaces with Supple", published in Artificial Intelligence, vol. 174, Issues 12-13, pp. 910-950, https://www.sciencedirect.com/science/article/pii/S0004370210000822, Aug. 2010.

* cited by examiner

*Primary Examiner* — Matthew Mikels
(74) *Attorney, Agent, or Firm* — Rowand LLP

(57) ABSTRACT

A computing device comprises a communications module; a processor coupled with the communications module; and a memory coupled to the processor and storing processor-executable instructions which, when executed by the processor, configure the processor to initiate an automated teller machine session; engage an artificial intelligence engine to determine at least one dynamic user interface to be presented during the automated teller machine session; and present the at least one dynamic user interface on a display of an automated teller machine.

14 Claims, 10 Drawing Sheets

Welcome!

This ATM is only able to process withdrawals at this time

WITHDRAW $20

WITHDRAW $50

WITHDRAW $100

OTHER AMOUNT

FIG. 9

Welcome!

We have used AI to generate recommendations for this session:

WITHDRAW $100    DEPOSIT $1200

TAKE ME TO HOME SCREEN

STOP USING AI

FIG. 10

SYSTEM AND METHOD FOR PRESENTING AN ARTIFICIAL INTELLIGENCE-BASED AUTOMATED TELLER MACHINE SESSION

TECHNICAL FIELD

The present application relates to a system and method for presenting an artificial intelligence-based automated teller machine session.

BACKGROUND

Automated teller machines allow certain banking services to be performed without resort to a human teller. The banking services may be performed during an automated teller machine session.

During an automated teller machine session, the automated teller machine often presents a series of user interfaces or display screens in a static manner. For example, once an automated teller machine session has been initiated, the automated teller machine may present a first user interface to the user. The user interface may include a number of selectable options. The user may select one of the selectable options and in response the automated teller machine may present a series or sequence of user interfaces to complete or perform a particular banking service. The series or sequence of user interfaces are presented in a static manner such that a second user interface is displayed, followed by a third user interface, a fourth user interface, etc. The user interfaces are presented in sequence until the particular banking service has been performed. The automated teller machine may then return to present the first user interface to the user.

BRIEF DESCRIPTION OF THE DRAWINGS

Embodiments are described in detail below, with reference to the following drawings:

FIGS. 8 to 11 show example dynamic user interfaces presented in an artificial-intelligence based automated teller machine session.

Like reference numerals are used in the drawings to denote like elements and features.

DETAILED DESCRIPTION OF VARIOUS EMBODIMENTS

Figure 1:
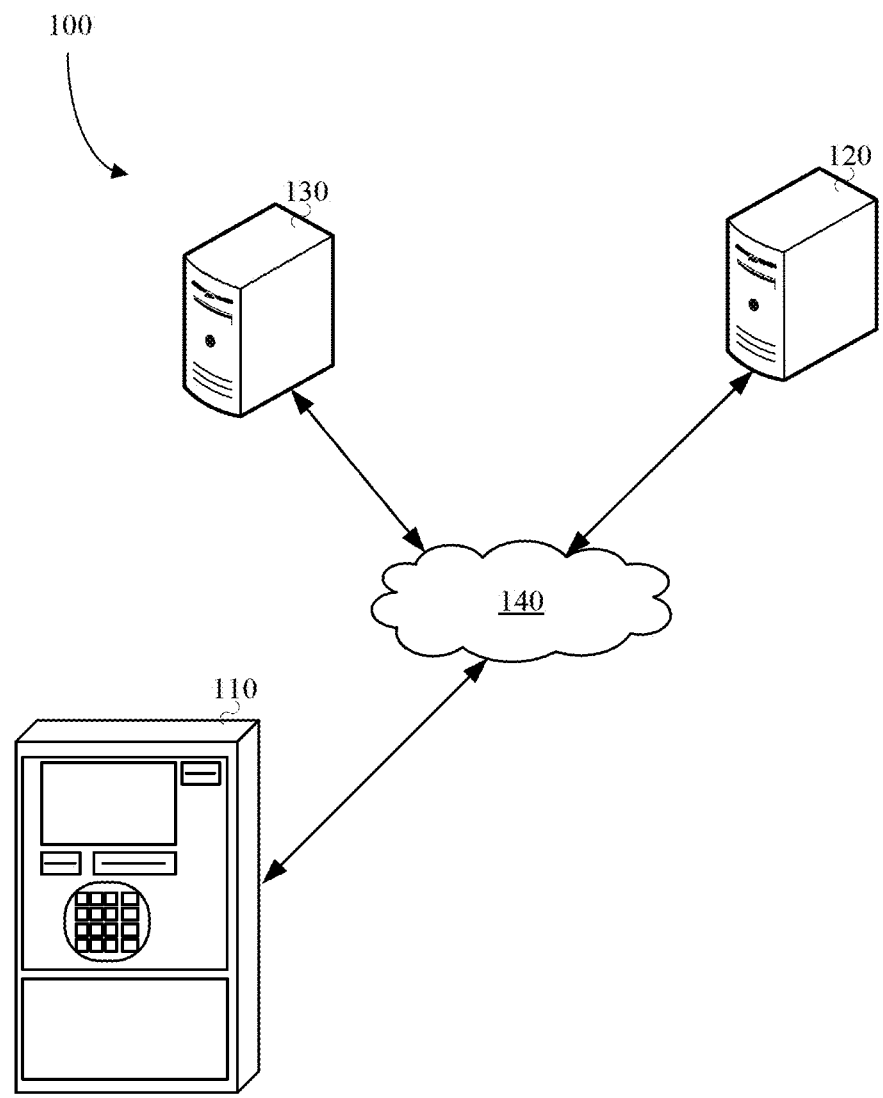
FIG. 1 is a schematic operation diagram illustrating an operating environment of an example embodiment.

Accordingly, in one aspect there is provided a server computer system comprising a communications module; a processor coupled with the communications module; and a memory coupled to the processor and storing processor-executable instructions which, when executed by the processor, configure the processor to initiate an automated teller machine session; engage an artificial intelligence engine to determine at least one dynamic user interface to be presented during the automated teller machine session; and present the at least one dynamic user interface on a display of an automated teller machine.

In one or more embodiments, the artificial intelligence engine is trained using machine learning data.

In one or more embodiments, the machine learning data includes at least one of automated teller machine session data, historical automated teller machine session data, location data, event data or historical transaction data.

In one or more embodiments, the artificial intelligence engine is trained to predict at least one dynamic user interface likely to be accessed during the automated teller machine session.

In one or more embodiments, the at least one dynamic user interface likely to be accessed during the automated teller machine session is presented on the display of the automated teller machine immediately after the initiating of the automated teller machine session.

In one or more embodiments, the artificial intelligence engine is trained to selectively enable one or more functions available to be performed by the automated teller machine and to selectively disable one or more functions available to be performed by the automated teller machine.

In one or more embodiments, the at least one dynamic user interface limits functions available to be performed by the automated teller machine.

In one or more embodiments, the processor-executable instructions which, when executed by the processor, further configure the processor to obtain, via the communications module and from the automated teller machine, real-time automated teller machine session data; engage the artificial intelligence engine to determine at least one next dynamic user interface based on the real-time automated teller machine session data; and present the at least one next dynamic user interface on the display of the automated teller machine.

In one or more embodiments, the at least one dynamic user interface includes at least one input field and the artificial intelligence engine pre-populates the at least one input field prior to presenting the at least one dynamic user interface on the display of the automated teller machine.

In one or more embodiments, the at least one dynamic user interface includes one or more display screens to be presented in a non-linear manner during the automated teller machine session.

According to another aspect there is provided a computer-implemented method comprising initiating an automated teller machine session; engaging an artificial intelligence engine to determine at least one dynamic user interface to be presented during the automated teller machine session; and presenting the at least one dynamic user interface on a display of an automated teller machine.

In one or more embodiments, the artificial intelligence engine is trained using machine learning data.

In one or more embodiments, the machine learning data includes at least one of historical automated teller machine session data, location data, event data or historical transaction data.

In one or more embodiments, the artificial intelligence engine is trained to predict at least one dynamic user interface likely to be accessed during the automated teller machine session.

In one or more embodiments, the at least one dynamic user interface likely to be accessed during the automated teller machine session is presented on the display of the automated teller machine immediately after the initiating of the automated teller machine session.

In one or more embodiments, the artificial intelligence engine is trained to selectively enable one or more functions available to be performed by the automated teller machine and to selectively disable one or more functions available to be performed by the automated teller machine.

In one or more embodiments, the at least one dynamic user interface limits functions available to be performed by the automated teller machine.

In one or more embodiments, the method further comprises obtaining, from the automated teller machine, real-time automated teller machine session data; engaging the artificial intelligence engine to determine at least one next dynamic user interface based on the real-time automated teller machine session data; and presenting the at least one next dynamic user interface on the display of the automated teller machine.

In one or more embodiments, the at least one dynamic user interface includes at least one input field and the artificial intelligence engine pre-populates the at least one input field prior to presenting the at least one dynamic user interface on the display of the automated teller machine.

According to another aspect there is provided a non-transitory computer readable storage medium comprising computer-executable instructions which, when executed, configure a processor to initiate an automated teller machine session; engage an artificial intelligence engine to determine at least one dynamic user interface to be presented during the automated teller machine session; and present the at least one dynamic user interface on a display of an automated teller machine.

Aspects and features of the present application will be understood by those of ordinary skill in the art from a review of the following description of examples in conjunction with the accompanying figures.

In the present application, the term "and/or" is intended to cover all possible combinations and sub-combinations of the listed elements, including any one of the listed elements alone, any sub-combination, or all of the elements, and without necessarily excluding additional elements.

In the present application, the phrase "at least one of . . . or . . . " is intended to cover any one or more of the listed elements, including any one of the listed elements alone, any sub-combination, or all of the elements, without necessarily excluding any additional elements, and without necessarily requiring all of the elements.

In the present application, examples involving a general-purpose computer, aspects of the disclosure transform the general-purpose computer into a special-purpose computing device when configured to execute the instructions described herein.

FIG. 1 is a schematic operation diagram illustrating an operating environment of an example embodiment. As shown, a system 100 includes an automated teller machine 110, an automated teller machine switch 120, and a server computer system 130 coupled to one another through a network 140, which may include a public network such as the Internet and/or a private network. The automated teller machine 110, the automated teller machine switch 120, and the server computer system 130 may be in geographically disparate locations. Put differently, the automated teller machine 110, the automated teller machine switch 120, and the server computer system 130 may be located remote from one another.

The automated teller machine 110 may be associated with a financial institution. The automated teller machine 110 is adapted to provide access to banking services such as, for example, withdrawals and deposits.

The automated teller machine switch 120 and the server computer system 130 are computer server systems. A computer server system may, for example, be a mainframe computer, a minicomputer, or the like. In some implementations thereof, a computer server system may be formed of or may include one or more computing devices. A computer server system may include and/or may communicate with multiple computing devices such as, for example, database servers, computer servers, and the like. Multiple computing devices such as these may be in communication using a computer network and may communicate to act in cooperation as a computer server system. For example, such computing devices may communicate using a local-area network (LAN). In some embodiments, a computer server system may include multiple computing devices organized in a tiered arrangement. For example, a computer server system may include middle tier and back-end computing devices. In some embodiments, a computer server system may be a cluster formed of a plurality of interoperating computing devices.

The automated teller machine switch 120 may be adapted to broker (e.g., relay) communication between the automated teller machine 110 and a payment network (not shown). The automated teller machine switch 120 may perform operations related to performing transactions using the automated teller machine 110. For example, the automated teller machine switch 120 may perform operations related to authorizing and/or completing transactions based on cheques deposited at the automated teller machine 110. The automated teller machine switch 120 may additionally or alternatively perform operations related to authenticating a user of the automated teller machine 110. For example, the automated teller machine switch 120 may perform operations to authenticate a user based on data from a card used to access the automated teller machine 110 and based on a personal identification number (PIN) received as input by the automated teller machine 110.

The server computer system 130 may be associated with a financial institution and the financial institution may be the same financial institution associated with the automated teller machine 110. As will be described in more detail below, the server computer system 130 may include an artificial intelligence engine that may execute instructions to generate and present an artificial intelligence-based automated teller machine session.

The network 140 is a computer network. In some embodiments, the network 140 may be an internetwork such as may be formed of one or more interconnected computer networks. For example, the network 140 may be or may include an Ethernet network, an asynchronous transfer mode network, a wireless network, a telecommunications network, or the like.

Figure 2:
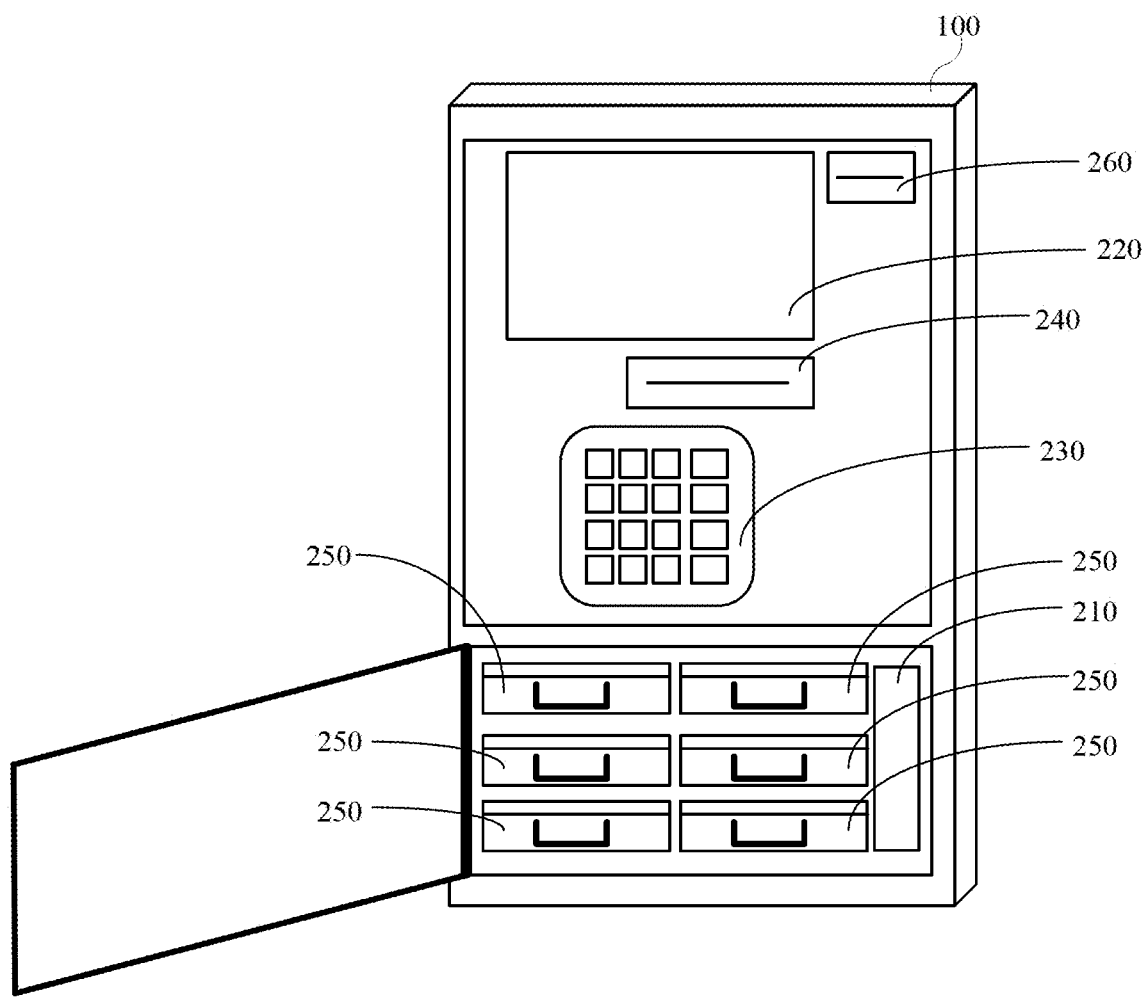
FIG. 2 is a simplified diagram showing components of an example automated teller machine.

FIG. 2 illustrates example components of the automated teller machine 110. The automated teller machine 110 is adapted to provide access to banking services such as for example withdrawals and deposits. As shown in FIG. 2, the automated teller machine 110 includes a controller 210, a display 220, a keypad 230, an item receiver/dispenser 240, cassettes 250, and a card reader 260.

As further described below, the controller 210 is a computing device. For example, the controller 210 may include a processor that executes instructions retrieved from a computer-readable medium thereby causing the automated teller machine 110 to perform operations for providing access to banking services.

The display 220 may for example, be a liquid-crystal display (LCD), a cathode-ray tube (CRT), or the like. The display 220 may present a user interface to a customer or user of the automated teller machine 110.

The keypad 230 is an input device allowing input to be provided to the automated teller machine 110. Input received via the keypad 230 may be conveyed to the controller 210. The keypad 230 may be used by a user to provide a personal identification number (PIN) to the automated teller machine 110 as a part of authenticating to the automated teller machine 110.

The item receiver/dispenser 240 is a device allowing value instruments to be received by the automated teller machine 110 or dispensed by the automated teller machine 110. The value instruments may include banknotes and/or cheques. The item receiver/dispenser 240 may provide a single slot through which value instruments may be dispensed. Additionally or alternatively, the item receiver/dispenser 240 may provide multiple slots. It may be that components or units of the item receiver/dispenser 240 are specialized to a particular type or types of value instrument. For example, a particular component or unit of the item receiver/dispenser 240 may be adapted to receiving and/or dispensing banknotes of one denomination, while another component or unit may be adapted to receiving and/or dispensing banknotes of another denomination. Alternatively, it may be that the item receiver/dispenser 240 is a monolithic unit that handles all manner of value instruments.

As mentioned above, the automated teller machine includes one or more cassettes 250. The item receiver/dispenser 240 may be in communication with the cassettes 250. Some or all of the cassettes 250 may be adapted to dispense value instruments. For example, some of the cassettes 250 may be for dispensing banknotes of particular denominations.

The item receiver/dispenser 240 and the cassettes 250 may be collectively considered a value instrument dispenser adapted to dispense value instruments such as to satisfy withdrawals from the automated teller machine 110.

The card reader 260 allows data to be read from a card or access card such as for example a common ISO-sized automated teller machine or cheque card. For example, the card reader 260 may allow data to be read from magnetic stripe cards and/or chip cards. In some embodiments, the card reader 260 may require a card to be swiped through it to be read (a so-called "swipe reader") and/or it may allow a card to be inserted into it for reading (a so-called "dip reader"). In some embodiments, the card reader 260 may be adapted to allow inserted cards to be retained by the automated teller machine 110 indefinitely (such as if fraud is suspected) and/or for the period of a session.

Figure 3:
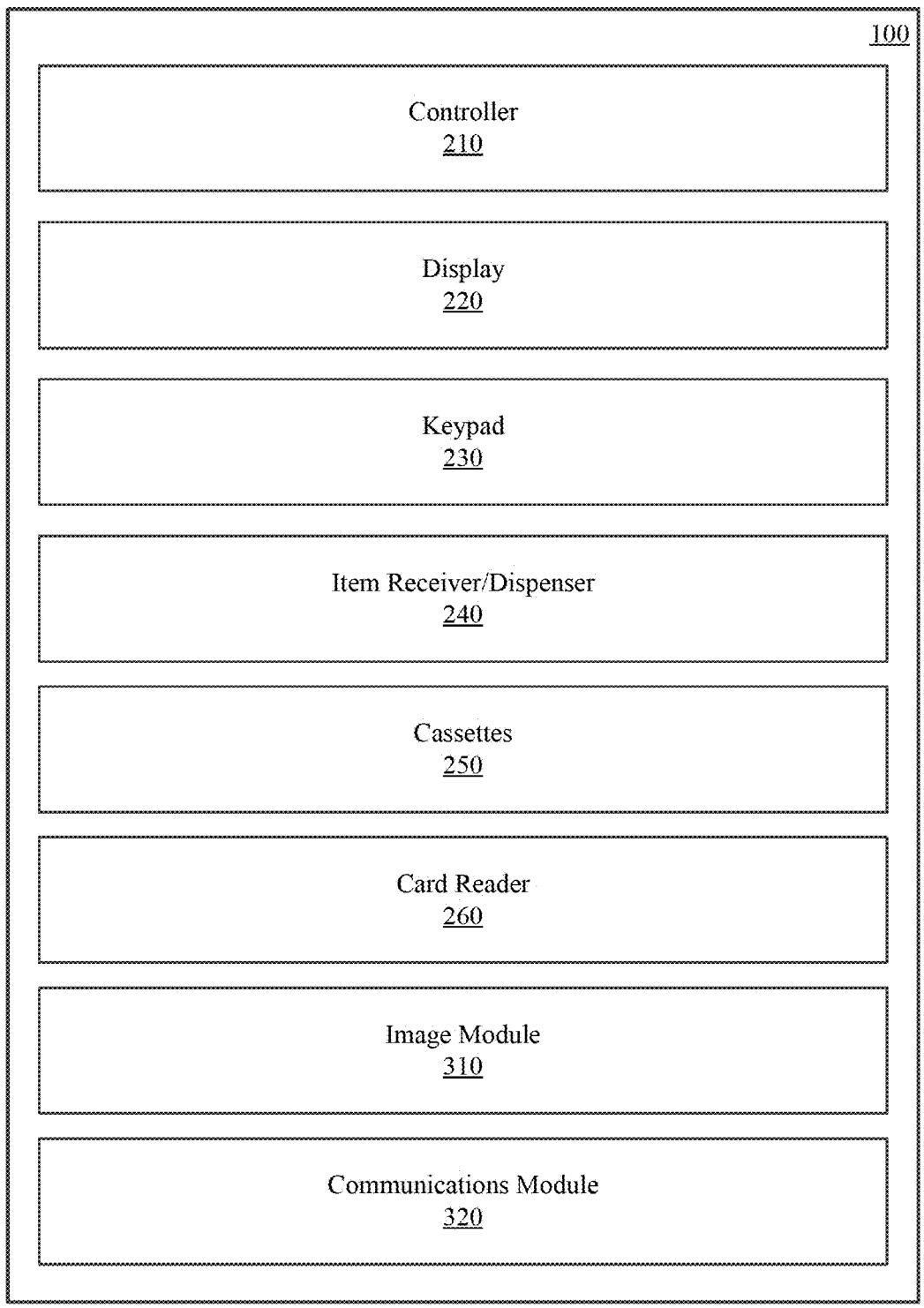
FIG. 3 is a logical block diagram of the example automated teller machine of FIG. 2.

FIG. 3 is a logical block diagram of the automated teller machine 110. As described above, the automated teller machine 110 may include a controller 210, a display 220, a keypad 230, an item receiver/dispenser 240, cassettes 250, and a card reader 260 as described above. Additionally, as shown in FIG. 3, the automated teller machine 110 may include an image module 310 and a communications module 320.

The image module 310 is adapted to scan or capture images of value instruments received by the automated teller machine 110. For example, the image module 310 may scan or capture images of value instruments (such as, for example, bank notes, negotiable instruments like cheques, money orders, bank drafts, warrants of payment, etc.) as they are received by the automated teller machine 110 such as, for example, by way of the item receiver/dispenser 240. The image module 310 may include a colour, black and white, or a grayscale scanner. In one or more embodiments, image module 310 may include an ultraviolet scanner and the ultraviolet scanner may be engaged to identify security features for counterfeit detection. The image module 310 may include a number of scanning technologies. For example, the image module 310 may include a contact image sensor (CIS), a charge-coupled device (CCD), etc.

The communications module 320 allows the automated teller machine 110 to communicate with other computing devices and/or various communications networks such as, for example, the network 140. In other words, the communications module 320 may allow the automated teller machine 110 to send or receive communications signals. Communications signals may be sent or received according to one or more protocols or according to one or more standards. For example, the communications module 320 may allow the automated teller machine 110 to communicate via an Ethernet network, an automated teller machine network, a telephone network, and/or via cellular data network, such as for example, according to one or more standards such as, for example, Global System for Mobile Communications (GSM), Code Division Multiple Access (CDMA), Evolution Data Optimized (EVDO), Long-term Evolution (LTE) or the like. Additionally or alternatively, the communications module 320 may allow the automated teller machine 110 to communicate using near-field communication (NFC), via Wi-Fi™, using Bluetooth™ or via some combination of one or more networks or protocols.

Figure 4:
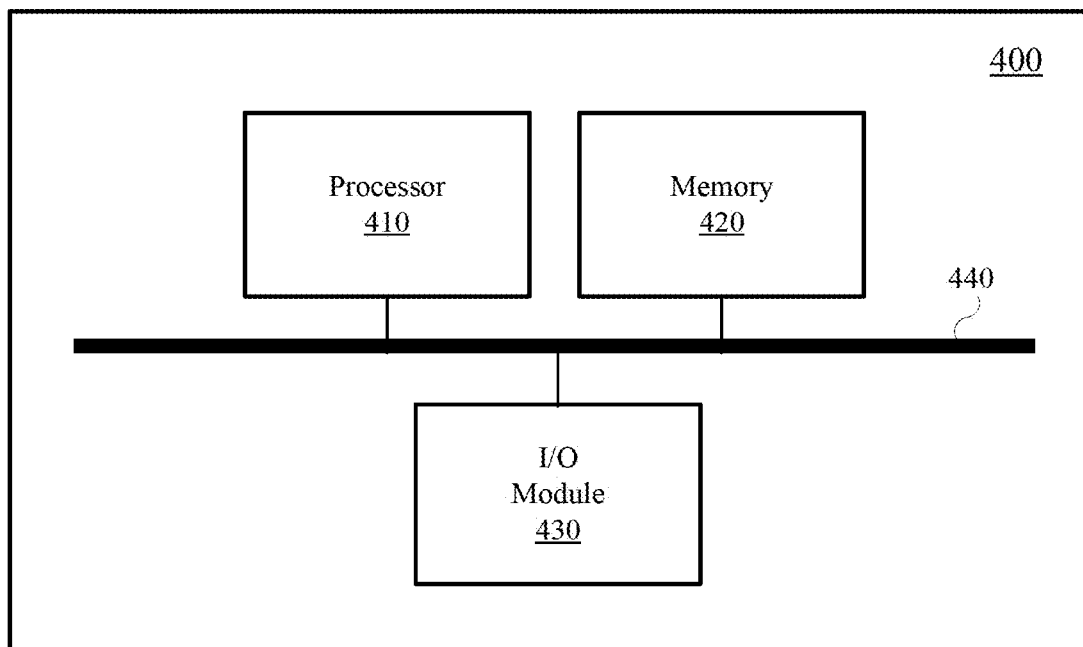
FIG. 4 is a high-level operation diagram of an example computing device.

FIG. 4 is a high-level operation diagram of an example computing device 400. In some embodiments, the example computing device 400 may be exemplary of the controller 210 (FIG. 2), the automated teller machine switch 120 and/or the server computer system 130. Each of the automated teller machine 110, the automated teller machine switch 120 and the server computer system 130 include software that adapts it to perform a particular function.

The example computing device 400 includes a variety of modules. For example, as illustrated, the example computing device 400 may include a processor 410, a memory 420, and an input/output (I/O) module 430. As illustrated, the foregoing example modules of the example computing device 400 are in communication over a bus 440.

The processor 410 is a hardware processor. The processor 410 may, for example, be one or more ARM, Intel x86, PowerPC processors or the like.

The memory 420 allows data to be stored and retrieved. The memory 420 may include, for example, random access memory, read-only memory, and persistent storage. Persistent storage may be, for example, flash memory, a solid-state drive or the like. Read-only memory and persistent storage are non-transitory computer-readable storage mediums. A computer-readable medium may be organized using a file system such as may be administered by an operating system governing overall operation of the example computing device 400.

The I/O module 430 allows the example computing device 400 to interact with devices such as, for example, peripherals to send and receive data. The I/O module 430 may, for example, allow the example computing device 400 to interface with input devices such as, for example, keypads, keyboards, pointing devices, and the like. In another example, the I/O module 430 may, for example, allow the example computing device 400 to interface with output devices such as, for example, displays, printers, and the like. In a particular example, where the example computing device 400 forms a part of the automated teller machine 110 (FIG. 1) such as, for example, if the example computing device 400 is or forms a part of the controller 210 (FIG. 2) of the automated teller machine 110, the I/O module 430 may allow the example computing device 400 to interface with, for example, one or more of the display 220, the keypad 230, the item receiver/dispenser 240, cassettes 250, the card reader 260, the image module 310 and/or the communications module 320.

Software comprising instructions is executed by the processor 410 from a computer-readable medium. For example, software may be loaded into random-access memory from persistent storage of the memory 420. Additionally, or alternatively, instructions may be executed by the processor 410 directly from read-only memory of the memory 420.

Figure 5:
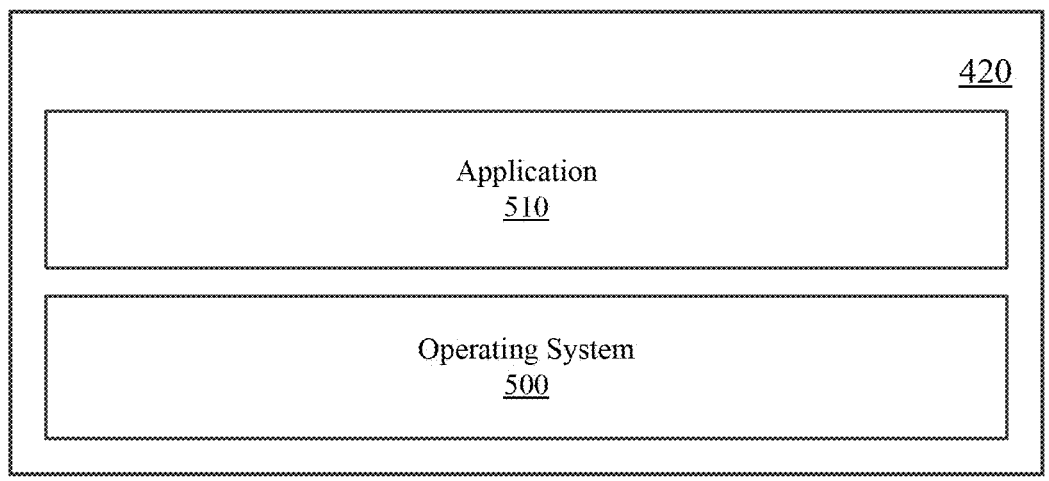
FIG. 5 depicts an example simplified software organization of the example computing device of FIG. 4.

FIG. 5 depicts a simplified organization of software components stored in the memory 420 of the example computing device 400 (FIG. 4). As illustrated, these software components include an operating system 500 and application 510.

The operating system 500 is software. The operating system 500 allows the application 510 to access the processor 410, the memory 420, and the I/O module 430 of the example computing device 400 (FIG. 4). The operating system 500 may be, for example, Google™ Android™, Apple™ iOS™, UNIX™, Linux™, Microsoft™ Windows™, Apple OSX™ or the like.

The application 510 adapts the example computing device 400, in combination with the operating system 500, to operate as a device performing a particular function. For example, the application 510 may cooperate with the operating system 500 to adapt a suitable embodiment of the example computing device 400 to operate as the controller 210 (FIG. 2) of the automated teller machine 110 (FIG. 1) and/or the server computer system 130.

While a single application 510 is illustrated in FIG. 5, in operation the memory 420 may include more than one application 510 and different applications 510 may perform different operations. For example, in at least some embodiments in which the computing device 400 is functioning as the automated teller machine 110 and/or the server computer system 130, the applications 510 may include an artificial intelligence engine. The artificial intelligence engine may store instructions that generate and present an artificial intelligence-based automated teller machine session to the automated teller machine 110.

The artificial intelligence engine may receive data from a plurality of sources and, using one or more artificial intelligence or machine learning algorithms, generate and present the artificial intelligence-based automated teller machine session. The artificial intelligence or machine learning algorithms may include, for example, artificial neural network algorithms, supervised learning algorithms, unsupervised learning algorithms, regression algorithms, instance base algorithms, regularization algorithms, decision tree algorithms, Bayesian algorithms, clustering algorithms, etc. Other algorithms may be used in addition or in alternative to those listed above.

The data received from the plurality of sources may include machine learning data. In one or more embodiments, the machine learning data may include automated teller machine session data, historical automated teller machine session data, location data, event data, and/or historical transaction data.

The automated teller machine session data may include real-time automated teller machine session data obtained from the automated teller machine 110 during an active automated teller machine session. The automated teller machine session data may include an identification of one or more accounts of a customer that initiated the active automated teller machine session and one or more of data indicating actions performed by the customer at the automated teller machine 110 and in what order, screen shots of graphical user interfaces presented to the customer during the automated teller machine session, images of cheque deposits, the automated teller machine 110 terminal identification, a time of the automated teller machine session, a date of the automated teller machine session, a customer identifier, account identifiers, amounts of funds withdrawn or deposited during the automated teller machine session and/or an image of a transaction receipt for one or more transactions completed during the automated teller machine session. The automated teller machine session data may be obtained from the automated teller machine 110 in real-time starting at the beginning of the automated teller machine session (once authentication has been completed) to the end of the automated teller machine session (when the card has been returned to the customer).

The historical automated teller machine session data may include automated teller machine session data obtained from previous automated teller machine sessions. The previous automated teller machine sessions may include automated teller machine sessions previously conducted by the user and/or automated teller machine sessions previously conducted by the automated teller machine 110. The historical automated teller machine session data may be obtained from the automated teller machine 110, obtained from a database associated with the automated teller machine 110, and/or obtained from a database associated with the server computer system 130. The historical automated teller machine session data may include one or more of data indicating actions performed by the customer at the automated teller machine 110 and in what order, screen shots of graphical user interfaces presented to the customer during the automated teller machine session, images of cheque deposits, the automated teller machine 110 terminal identification, a time of the automated teller machine session, a date of the automated teller machine session, a customer identifier, account identifiers, amounts of funds withdrawn or deposited during the automated teller machine session and/or an image of a transaction receipt for one or more transactions completed during the automated teller machine session. The historical automated teller machine session data may be logged from the beginning of the automated teller machine session (once authentication has been completed) to the end of the automated teller machine session (when the card has been returned to the customer).

The location data may include a location of the automated teller machine 110. In one or more embodiments, the location data may additionally include locations of automated teller machines accessed by the customer over a predefined time period. For example, the location data may include the locations of all automated teller machines accessed by the customer over the past year.

The event data may include, for example, community event data that indicates a particular event or events that are scheduled to take place. For example, the event data may indicate that an event such as for example a state fair, a concert, a sporting event, etc. is scheduled to take place during a particular time period. The event data may include location data identifying the location of the event and this may include, for example, a geo-fence outlining the location boundaries for the event.

The historical transaction data may include historical transaction data for the customer currently using the automated teller machine. For example, the server computer system 130 may obtain, from a database, historical transaction data that includes a list of all transactions (deposits, withdrawals, etc.) completed within a particular time period for a bank account of the customer. The particular time period may include, for example, the past month, year, etc.

The artificial intelligence engine may be trained using the machine learning data and may determine at least one dynamic user interface to be presented during an automated teller machine session. For example, the artificial intelligence engine may be trained to predict at least one dynamic user interface that is likely to be accessed during the automated teller machine session.

Figure 6:
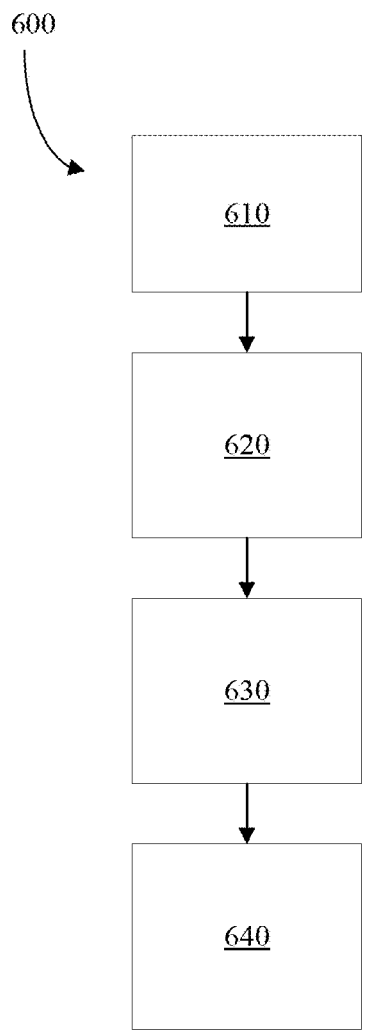
FIG. 6 shows an example static linear series or sequence of user interfaces presented on conventional automated teller machines.

Conventional automated teller machines often present a welcome screen followed by a static linear series or sequence of user interfaces. An example static linear series or sequence of user interfaces 600 is shown in FIG. 6. The sequence of user interfaces 600 may be associated with a banking operation and is similar to that performed by conventional automated teller machines. As can be seen, the sequence of user interfaces 600 includes a first user interface 610, a second user interface 620, a third user interface 630, and a fourth user interface 640. The conventional automated teller machine presents the sequence of user interfaces 600 in a static or linear manner such that the first user interface 610 is displayed, then the second user interface 620, the third user interface 630, then the fourth user interface 640. Once the banking operation associated with the sequence of user interfaces 600 has been completed, the conventional automated teller machine may return to a home screen where the customer may request another banking operation that may be associated with another static linear series or sequence of user interfaces.

Unlike conventional automated teller machines that present the static linear series or sequence of user interfaces, the artificial intelligence engine may communicate with the automated teller machine 110 to present at least one dynamic user interface during an active automated teller machine session. Put another way, rather than present a welcome screen followed by a static linear series or sequence of user interfaces (such as that performed by conventional automated teller machines), the artificial intelligence engine may cause the automated teller machine 110 to present one or more dynamic user interfaces during an artificial intelligence-based automated teller machine session.

Figure 7:
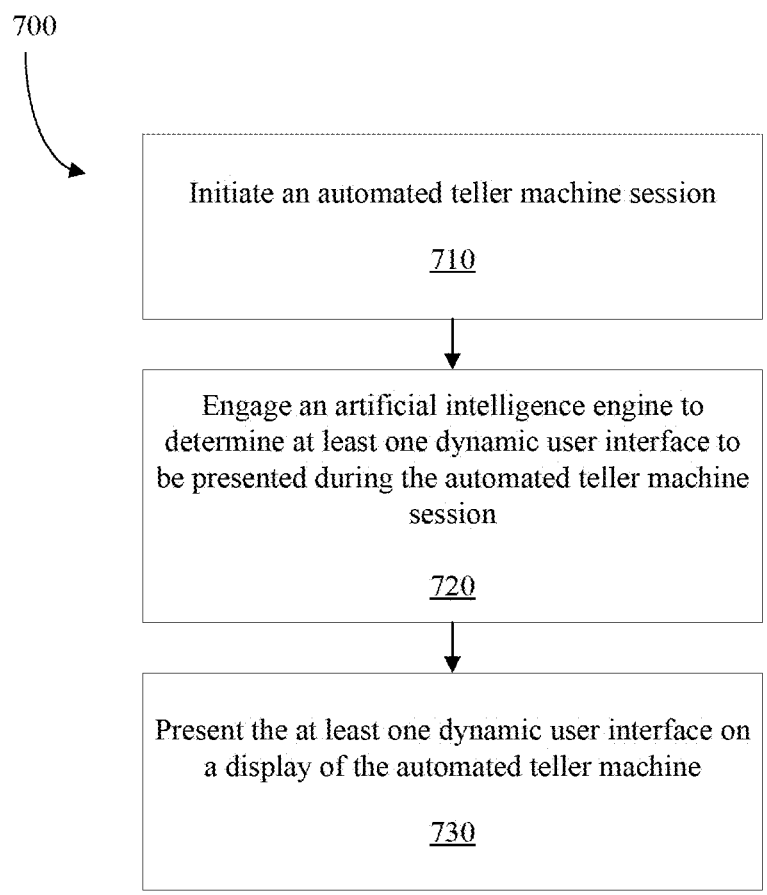
FIG. 7 is a flowchart showing operations performed in presenting an artificial intelligence-based automated teller machine session according to an embodiment.

Reference is made to FIG. 7, which illustrates, in flowchart form, a method 700 for presenting an artificial intelligence-based automated teller machine session. The method 700 may be implemented by a computing device having suitable processor-executable instructions for causing the computing device to carry out the described operations. The method 700 may be implemented, in whole or in part, by at least one of the server computer system 130 and/or the automated teller machine 110.

The method 700 includes initiating an automated teller machine session (step 710).

To initiate the automated teller machine session, the automated teller machine 110 may require a user to authenticate using, for example, an authentication token. Authentication may include receiving an indication of an authentication token and authenticating the authentication token. In one or more embodiments, authenticating may require two-factor authentication. For example, in one or more embodiments, the automated teller machine 110 may require the user to enter a PIN associated with the card that was inserted into the card reader 260. The user may enter the PIN using, for example, the keypad 230 of the automated teller machine 110. Responsive to receiving the PIN, the automated teller machine 110 may determine that the PIN is indeed associated or linked with the card. Once authenticated, the automated teller machine 110 may identify an account associated with the authentication token.

Once authentication has been completed, an automated teller machine session begins. As will be appreciated, during the automated teller machine session, the automated teller machine 110 may perform one or more tasks associated with the account. The tasks may include depositing funds, withdrawing funds, determining an account balance, etc.

The method 700 includes engaging an artificial intelligence engine to determine at least one dynamic user interface to be presented during the automated teller machine session (step 720).

The automated teller machine 110 and/or the server computer system 130 engages the artificial intelligence engine and in this manner the automated teller machine session may be referred to as an artificial intelligence-based automated teller machine session.

As mentioned, the artificial intelligence engine is trained to generate and present at least one dynamic user interface to be presented during the automated teller machine session. In one or more embodiments, the artificial intelligence engine may receive, in real-time, automated teller machine session data from the automated teller machine 110. The automated teller machine session data may include an identification of one or more accounts of a customer that initiated the active automated teller machine session and this may be determined based on the authentication performed to initiate the automated teller machine session.

The artificial intelligence engine may determine at least one dynamic user interface to be presented during the automated teller machine session. For example, the artificial intelligence engine may be trained to predict at least one dynamic user interface likely to be accessed during the automated teller machine session.

In one or more embodiments, the artificial intelligence engine may determine, based on the machine learning data, that the customer is likely to request that the automated teller machine perform a specific banking operation. For example, the artificial intelligence engine may analyze historical automated teller machine session data of the customer that initiated the automated teller machine session and may determine that, over the last year, the customer has deposited a cheque every other Friday. The artificial intelligence engine may determine that the current date of the automated teller machine session is on a Friday and that the customer did not deposit a cheque last Friday. As such, the artificial intelligence engine may determine that it is likely that the customer is going to be depositing a cheque during the automated teller machine session and may determine that a dynamic user interface associated with depositing a cheque is to be presented during the automated teller machine session.

As another example, the artificial intelligence engine may determine that, over the last year, the customer has deposited a cheque every other Friday for a particular amount. The artificial intelligence engine may determine that the current date of the automated teller machine session is on a Friday and that the customer did not deposit a cheque last Friday. As such, the artificial intelligence engine may determine that it is likely that the customer is going to be depositing a cheque for the particular amount during the automated teller machine session and may determine that a dynamic user interface associated with depositing a cheque is to be presented during the automated teller machine session. The artificial intelligence engine may also determine that it is likely that the cheque being deposited is for the particular amount. As such, the artificial intelligence engine may pre-populate an input field of the dynamic user interface based on the particular amount.

As another example, the artificial intelligence engine may determine that, over the last year, the customer has transferred funds from a chequing to a savings account every month. The artificial intelligence engine may determine that the customer has not yet transferred funds in the current month. As such, the artificial intelligence engine may determine that it is likely that the customer is going to be transferring funds during the automated teller machine session and may determine that a dynamic user interface associated with transferring funds is to be presented during the automated teller machine session.

The artificial intelligence engine may similarly analyze the machine learning data to predict one or more additional banking operations the customer is likely to request that the automated teller machine perform.

The method 700 includes presenting the at least one dynamic user interface on a display of the automated teller machine (step 730).

In one or more embodiments, the at least one dynamic user interface is presented on the display of the automated teller machine immediately after the initiating of the automated teller machine session. For example, rather than present a graphical user interface such as a home screen that includes selectable options for requesting that the automated teller machine perform various banking operations, the artificial intelligence engine performs operations to cause the automated teller machine to present at least one dynamic user interface immediately after the automated teller machine session has been initiated.

As one example, during step 720, the artificial intelligence engine may have determined that it is likely that the customer is going to be depositing a cheque during the automated teller machine session and may have determined that a dynamic user interface associated with depositing a cheque is to be presented during the automated teller machine session. As such, the artificial intelligence engine may perform operations to cause the automated teller machine to display the dynamic user interface associated with depositing a cheque immediately after the initiating of the automated teller machine session.

As another example, during step 720, the artificial intelligence engine may have determined that it is likely that the customer is going to be depositing a cheque during the automated teller machine session for a particular amount and may have determined that a dynamic user interface associated with depositing a cheque is to be presented during the automated teller machine session. The artificial intelligence engine may have also determined that it is likely that the cheque being deposited is for the particular amount. As such, the artificial intelligence engine may have pre-populated an input field of the dynamic user interface based on the particular amount. As such, the artificial intelligence engine may perform operations to cause the automated teller machine to display the dynamic user interface associated with depositing the cheque for the particular amount immediately after the initiating of the automated teller machine session. It will be appreciated that the dynamic user interface may include selectable options and/or input fields for adjusting the particular amount.

The customer may interact with the automated teller machine to complete the one or more banking operations. The automated teller machine session data may be obtained in real-time and analyzed to determine that one or more banking operations have been completed. The artificial intelligence engine may be engaged to determine at least one next dynamic user interface to be displayed on the automated teller machine. The artificial intelligence engine may perform operations to cause the automated teller machine to present the at least one next dynamic user interface on the display of the automated teller machine.

As one example, the artificial intelligence engine may determine, based on the machine learning data, that the customer is likely to request that the automated teller machine display an updated balance of their account after a deposit has been processed into that account. The artificial intelligence engine may determine that the at least one next dynamic user interface to be displayed is a user interface that includes an updated balance of the account. As such, the artificial intelligence engine may perform operations to present the at least one next dynamic user interface on the display of the automated teller machine.

In manners described herein, the artificial intelligence engine may perform operations to cause the automated teller machine to present at least one dynamic user interface in a non-linear manner during the automated teller machine session. Put another way, the at least one dynamic user interface includes display screens that are to be presented in a non-linear manner during the automated teller machine session. As a result, the artificial intelligence engine presents an artificial intelligence-based automated teller machine session that is customized for the customer. The artificial intelligence engine reduces the overall use of computing resources as the automated teller machine does not present graphical user interfaces and does not communicate information over the network that is not required to complete banking operations for the user. Put another way, by dynamically presenting graphical user interfaces likely to be accessed by the customer during the automated teller machine session, the overall use of computing resources is reduced during the automated teller machine session.

Further, the artificial intelligence engine automatically causes the automated teller machine to present the one or more dynamic user interfaces and this may be done immediately after the automated teller machine session has been initiated. As such, the customer is not required to navigate to multiple user interfaces or display screens to complete one or more banking operations and this may reduce the overall use of computing resources. For example, the artificial intelligence engine may cause the automated teller machine to present a dynamic user interface that includes an input field that is pre-populated prior to display and as such the customer is not required to navigate to multiple user interfaces or display screens and is not required to complete the input field during the automated teller machine session.

It will be appreciated that the dynamic user interface presented on the display of the automated teller machine may include one or more selectable options that may be selected by the user to return to a home screen and/or to request that the automated teller machine perform one or more other banking operations.

In one or more embodiments, the artificial intelligence engine is trained to selectively enable one or more functions available to be performed by the automated teller machine and to selectively disable one or more functions available to be performed by the automated teller machine.

For example, the artificial intelligence engine may determine, based on the machine learning data, that the automated teller machine is located within the geo-fence of a community event that is likely to be occupied by a large number of people. In one or more embodiments, the machine learning data may include cellular network traffic and the artificial intelligence engine may analyze cellular network traffic in one or more areas within or close to the geo-fence of the community event or within proximity of a particular automated teller machine. The artificial intelligence engine may determine that it is likely that a large number of customers will be using the automated teller machine and as such the artificial intelligence engine may perform operations to enable the "withdraw" banking operation function and may perform operations to disable the "deposit" banking operation function on the automated teller machine. As such, the automated teller machine may only be used by customers to perform a withdrawal and may not be used to deposit funds to their bank account. It will be appreciated that the artificial intelligence engine may determine that the community event is over or may determine, based on the cellular network traffic, that the community event is not busy and in response the artificial intelligence engine may perform operations to enable both the "withdraw" banking operation function and the "deposit" banking operation function on the automated teller machine. It will be appreciated that to limit functions available to be performed by the automated teller machine, the artificial intelligence engine may adjust or modify the at least one dynamic user interface to limit the functions available to be performed by the automated teller machine. For example, the artificial intelligence engine may remove, from the at least one dynamic user interface, any selectable options for requesting that the automated teller machine perform a deposit or may select the at least one dynamic user interface based on what functions are available to be performed by the automated teller machine.

The artificial intelligence engine may additionally or alternatively perform operations to limit or define denominations of funds available to be withdrawn at the automated teller machine. For example, the artificial intelligence engine may determine, based on the machine learning data, that the automated teller machine is located within the geo-fence of a community event that is cash only and only sells tickets for $20. As such, the artificial intelligence engine may perform operations to limit or define that the automated teller machine is only to allow withdrawals in $20 increments.

The artificial intelligence engine may additionally or alternatively perform operations to adjust or modify one or more dynamic user interfaces and this may be based on the machine learning data. For example, the artificial intelligence engine may determine that a particular customer is new to using automated teller machines and may modify one or more of the dynamic user interfaces to include more instructions (additional text, images, etc.) to the customer. As another example, the artificial intelligence engine may determine that a particular customer is very experienced using automated teller machines and may modify one or more of the dynamic user interfaces to include less instructions (less text, images, etc.) or only a small amount of information to the user. As yet another example, the artificial intelligence engine may determine that a particular customer is above a certain age and as such may modify one or more of the dynamic user interfaces to increase the size of the text displayed thereon.

In one or more embodiments, the use of the artificial intelligence engine to present dynamic user interfaces may be selectively enabled or disabled by the customer. For example, at the start of an automated teller machine session, the automated teller machine may display a pop-up window to promote the use of the artificial intelligence engine. The pop-up window may include a selectable option to enable/disable the use of the artificial intelligence engine. The user may selectively enable/disable the use of the artificial intelligence engine in their automated teller machine preferences and this may be accessed on the automated teller machine and/or via online banking.

In one or more embodiments, the artificial intelligence engine may selectively provide recommendations for food, shopping, entertainment, etc. For example, the artificial intelligence engine may determine that the customer is using an automated teller machine outside of their local area and as such the automated teller machine may present recommendations for food, shopping, entertainment, etc. that are local to the automated teller machine being used.

The artificial intelligence engine may additionally generate and provide recommendations to the customer based on the machine learning data. For example, the artificial intelligence engine may determine, based on the machine learning data, that the customer withdraws a particular amount of money from an automated teller machine every week. The artificial intelligence engine may determine that the user has not withdrawn the particular amount of money within the past week and as such may send a push reminder to a mobile device associated with the customer that may be displayed in a mobile application or within a notification center resident on the mobile device. The artificial intelligence engine may perform operations to cause the automated teller machine to present a dynamic user interface for withdrawing the particular amount of money in response to the customer initiating an automated teller machine session.

In one or more embodiments, the artificial intelligence engine may perform operations to generate recommendations and the recommendations may be presented during the automated teller machine session. For example, the artificial intelligence may determine that the customer is eligible for a different type of banking account and, during an active automated teller machine session, may present a dynamic user interface that displays the recommendation and includes a selectable option to accept the recommendation.

Example dynamic user interfaces presented in an artificial-intelligence based automated teller machine session are shown in FIGS. 8 to 11.

Figure 8:
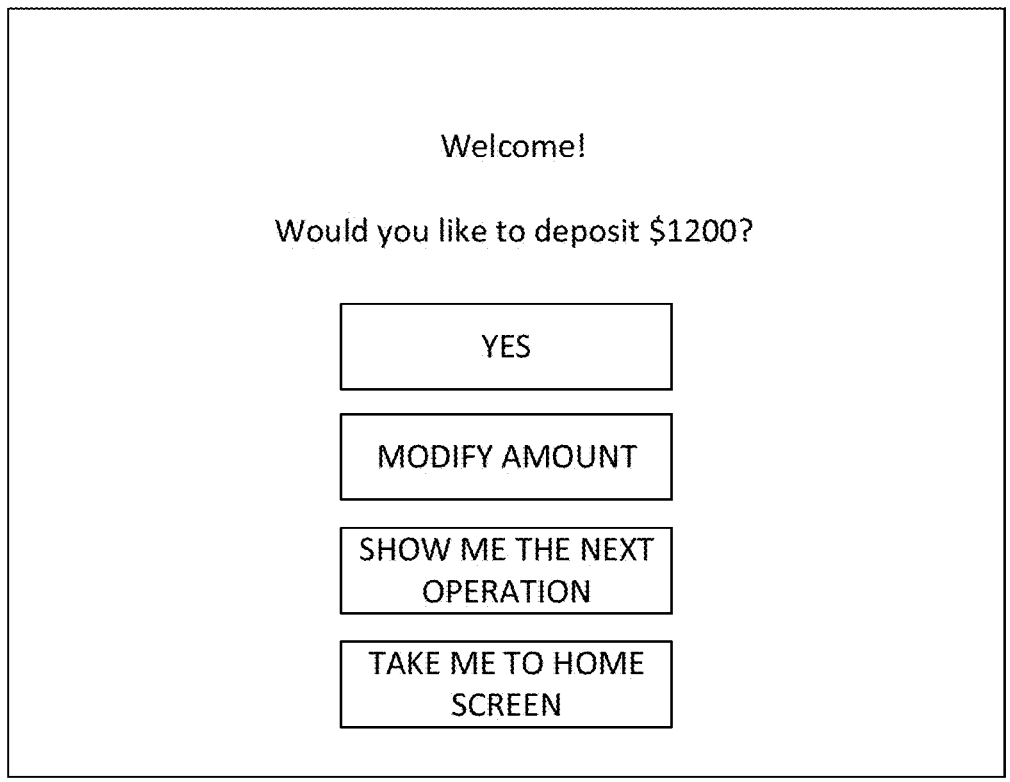

Specifically, FIG. 8 is a dynamic user interface for depositing a particular amount of money ($1200). In this example, the dynamic user interface may have been generated by engaging the artificial intelligence engine that may have determined that it was likely that the user was going to deposit $1200 during the automated teller machine session. The dynamic user interface includes additional options such as for example modifying the amount of money to be deposited, requesting that a next dynamic user interface be presented, or navigating back to a home screen.

FIG. 9 is a dynamic user interface for withdrawing money. In this example, the dynamic user interface may have been generated by engaging the artificial intelligence engine that may have determined that the automated teller machine was located within the geo-fence of a busy community event and as such has performed operation to only allow the automated teller machine to process withdrawals.

FIG. 10 is a dynamic user interface for withdrawing a particular amount of money ($100) or for depositing another particular amount of money ($1200). In this example, the dynamic user interface may have been generated by engaging the artificial intelligence engine that may have determined that it was likely that the user was going to withdraw $100 or was going to deposit $1200 during the automated teller machine session. The dynamic user interface includes additional options such as for example navigating back to a home screen or cancelling or turning off the use of the artificial intelligence engine.

Figure 11:

FIG. 11 is a dynamic user interface for withdrawing a particular amount of money ($100) or for depositing another particular amount of money ($1200). In this example, the dynamic user interface may have been generated by engaging the artificial intelligence engine that may have determined that it was likely that the user was going to withdraw $100 or was going to deposit $1200 during the automated teller machine session. The artificial intelligence engine also determined that the automated teller machine was outside of a home city of the user and as such has generated the dynamic user interface to include a message that the user is in a new city and to include a selectable option to see recommendations for local attractions (events, restaurants, etc.).

The methods described herein may be modified and/or operations of such methods combined to provide other methods.

Example embodiments of the present application are not limited to any particular operating system, system architecture, mobile device architecture, server architecture, or computer programming language.

It will be understood that the applications, modules, routines, processes, threads, or other software components implementing the described method/process may be realized using standard computer programming techniques and languages. The present application is not limited to particular processors, computer languages, computer programming conventions, data structures, or other such implementation details. Those skilled in the art will recognize that the described processes may be implemented as a part of computer-executable code stored in volatile or non-volatile memory, as part of an application-specific integrated chip (ASIC), etc.

As noted, certain adaptations and modifications of the described embodiments can be made. Therefore, the herein discussed embodiments are considered to be illustrative and not restrictive.

What is claimed is:

1. A computing device comprising:
a communications module;
a processor coupled with the communications module; and
a memory coupled to the processor and storing processor-executable instructions which, when executed by the processor, configure the processor to:
train an artificial intelligence engine solely to determine and present dynamic user interfaces and to pre-populate input fields of the dynamic user interfaces during automated teller machine sessions;
initiate an automated teller machine session;
engage the artificial intelligence engine to determine at least one dynamic user interface to be presented during the automated teller machine session, the at least one dynamic user interface including at least one input field, and to pre-populate the at least one input field; and
present the at least one dynamic user interface together with the pre-populated the at least one input field on a display of an automated teller machine as a first screen of the automated teller machine session and immediately after the initiating of the automated teller machine session.

2. The computing device of claim 1, wherein the artificial intelligence engine is trained using machine learning data.

3. The computing device of claim 2, wherein the machine learning data includes at least one of automated teller machine session data, historical automated teller machine session data, location data, event data or historical transaction data.

4. The computing device of claim 1, wherein the artificial intelligence engine is trained to selectively enable one or more functions available to be performed by the automated teller machine and to selectively disable one or more functions available to be performed by the automated teller machine.

5. The computing device of claim 1, wherein the at least one dynamic user interface limits functions available to be performed by the automated teller machine.

6. The computing device of claim 1, wherein the processor-executable instructions which, when executed by the processor, further configure the processor to:
obtain, via the communications module and from the automated teller machine, real-time automated teller machine session data;
engage the artificial intelligence engine to determine at least one next dynamic user interface based on the real-time automated teller machine session data; and
present the at least one next dynamic user interface on the display of the automated teller machine.

7. The computing device of claim 1, wherein the at least one dynamic user interface includes one or more display screens to be presented in a non-linear manner during the automated teller machine session.

8. A computer-implemented method comprising:
training an artificial intelligence engine solely to determine and present dynamic user interfaces and to pre-populate input fields of the dynamic user interfaces during automated teller machine sessions;
initiating an automated teller machine session;
engaging the artificial intelligence engine to determine at least one dynamic user interface to be presented during the automated teller machine session, the at least one dynamic user interface including at least one input field, and to pre-populate the at least one input field; and
presenting the at least one dynamic user interface together with the pre-populated the at least one input field on a display of an automated teller machine as a first screen of the automated teller machine session and immediately after the initiating of the automated teller machine session.

9. The computer-implemented method of claim 8, wherein the artificial intelligence engine is trained using machine learning data.

10. The computer-implemented method of claim 9, wherein the machine learning data includes at least one of historical automated teller machine session data, location data, event data or historical transaction data.

11. The computer-implemented method of claim 8, wherein the artificial intelligence engine is trained to selectively enable one or more functions available to be performed by the automated teller machine and to selectively disable one or more functions available to be performed by the automated teller machine.

12. The computer-implemented method of claim 8, wherein the at least one dynamic user interface limits functions available to be performed by the automated teller machine.

13. The computer-implemented method of claim 8, further comprising:
- obtaining, from the automated teller machine, real-time automated teller machine session data;
- engaging the artificial intelligence engine to determine at least one next dynamic user interface based on the real-time automated teller machine session data; and
- presenting the at least one next dynamic user interface on the display of the automated teller machine.

14. A non-transitory computer readable storage medium comprising computer-executable instructions which, when executed, configure a processor to:
- train an artificial intelligence engine solely to determine and present dynamic user interfaces and to pre-populate input fields of the dynamic user interfaces during automated teller machine sessions;
- initiate an automated teller machine session;
- engage the artificial intelligence engine to determine at least one dynamic user interface to be presented during the automated teller machine session, the at least one dynamic user interface including at least one input field, and to pre-populate the at least one input field; and
- present the at least one dynamic user interface together with the pre-populated the at least one input field on a display of an automated teller machine as a first screen of the automated teller machine session and immediately after the initiating of the automated teller machine session.

* * * * *